United States Patent
Magne-Drisch et al.

(10) Patent No.: US 6,350,929 B2
(45) Date of Patent: *Feb. 26, 2002

(54) PROCESS FOR ISOMERIZING AND DEHYDROGENATING USING A CATALYST ACTIVATED BY SULFURIZATION AND PASSIVATION WITH AMMONIA OR PRECURSOR THEREOF

(75) Inventors: Julia Magne-Drisch, Vilette de Vienne; Vincent Coupard; Jean-François Joly, both of Lyons; Fabio Alario, Neuilly sur Seine; Elisabeth Merlen, Rueil-Malmaison, all of (FR)

(73) Assignee: Institut Francais du Petrole (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/392,041
(22) Filed: Sep. 9, 1999

(30) Foreign Application Priority Data

Sep. 10, 1998 (FR) .............................. 98 11319

(51) Int. Cl.[7] .................................. C07C 5/22
(52) U.S. Cl. ...................... 585/319; 585/477; 585/480; 585/481; 585/482; 585/906
(58) Field of Search ................. 585/480, 481, 585/482, 906, 319, 477; 502/85, 86

(56) References Cited

U.S. PATENT DOCUMENTS

| 3,116,232 A | 12/1963 | Nager et al. ............... 208/64 |
| 3,409,685 A | 11/1968 | Donaldson ................. 585/481 |

(List continued on next page.)

FOREIGN PATENT DOCUMENTS

| EP | 051 318 | 5/1982 |
| EP | 249 914 | 12/1987 |
| EP | 0 335 754 | 10/1989 |
| EP | 0 369 078 | 5/1990 |
| EP | 0 490 696 | 6/1992 |
| EP | 0 812 620 | 12/1997 |
| FR | 2 209 827 | 7/1974 |
| FR | 2 668 951 | 5/1992 |
| GB | 851576 | 10/1960 |
| JP | 50-16780 | * 6/1975 |
| WO | 92/13046 | 8/1992 |
| WO | 96/16004 | 5/1996 |

*Primary Examiner*—Thuan D. Dang
(74) *Attorney, Agent, or Firm*—Millen, White, Zelano & Branigan, P.C.

(57) ABSTRACT

Process for isomerization of a feedstock that contains aromatic compounds with eight carbon atoms characterized in that it comprises at least one isomerization stage a) that is carried out in the presence of a catalyst that contains at least one metal of group VIII and that is activated according to an activation process that comprises at least one sulfurization stage and at least one stage for passivation with ammonia, and at least one dehydrogenation stage b).

19 Claims, 1 Drawing Sheet

U.S. PATENT DOCUMENTS

| | | | | |
|---|---|---|---|---|
| 3,409,686 A | * | 11/1968 | Mitsche | 260/668 |
| 3,553,276 A | * | 1/1971 | Berger et al. | 260/668 |
| 3,577,475 A | | 5/1971 | Csicsery | 585/482 |
| 3,632,525 A | | 1/1972 | Rausch | 502/223 |
| 3,644,200 A | | 2/1972 | Young | 208/120.15 |
| 3,748,255 A | | 7/1973 | Cassidy et al. | 208/65 |
| 3,915,843 A | | 10/1975 | Fanck et al. | 208/112 |
| 3,997,618 A | * | 12/1976 | Cornely et al. | 260/668 A |
| 3,998,900 A | * | 12/1976 | Wilhelm | 260/668 D |
| 4,062,903 A | * | 12/1977 | Jacobson | 260/668 A |
| 4,139,571 A | | 2/1979 | Riehm | 585/478 |
| 4,158,676 A | | 6/1979 | Smith | 585/481 |
| 4,255,606 A | | 3/1981 | Tse | 585/482 |
| 4,593,138 A | * | 6/1986 | Casci et al. | 585/481 |
| 4,695,667 A | | 9/1987 | Sumitami | 585/481 |
| 4,700,012 A | | 10/1987 | Onodera | 585/481 |
| 4,740,491 A | | 4/1988 | Wise | 502/216 |
| 4,740,650 A | | 4/1988 | Pellet | 585/480 |
| 4,762,957 A | * | 8/1988 | Sachtler et al. | 585/481 |
| 4,983,558 A | | 1/1991 | Born | 502/31 |
| 5,366,615 A | | 11/1994 | Bezman | 108/111.35 |
| 5,516,957 A | | 5/1996 | Dandekar | 585/482 |
| 6,057,486 A | | 5/2000 | Merlen | 585/481 |
| 6,059,956 A | | 5/2000 | Dufresne | 208/108 |
| 6,147,269 A | | 11/2000 | Joly | 585/314 |
| 6,198,014 B1 | | 3/2001 | Alario | 585/480 |

* cited by examiner

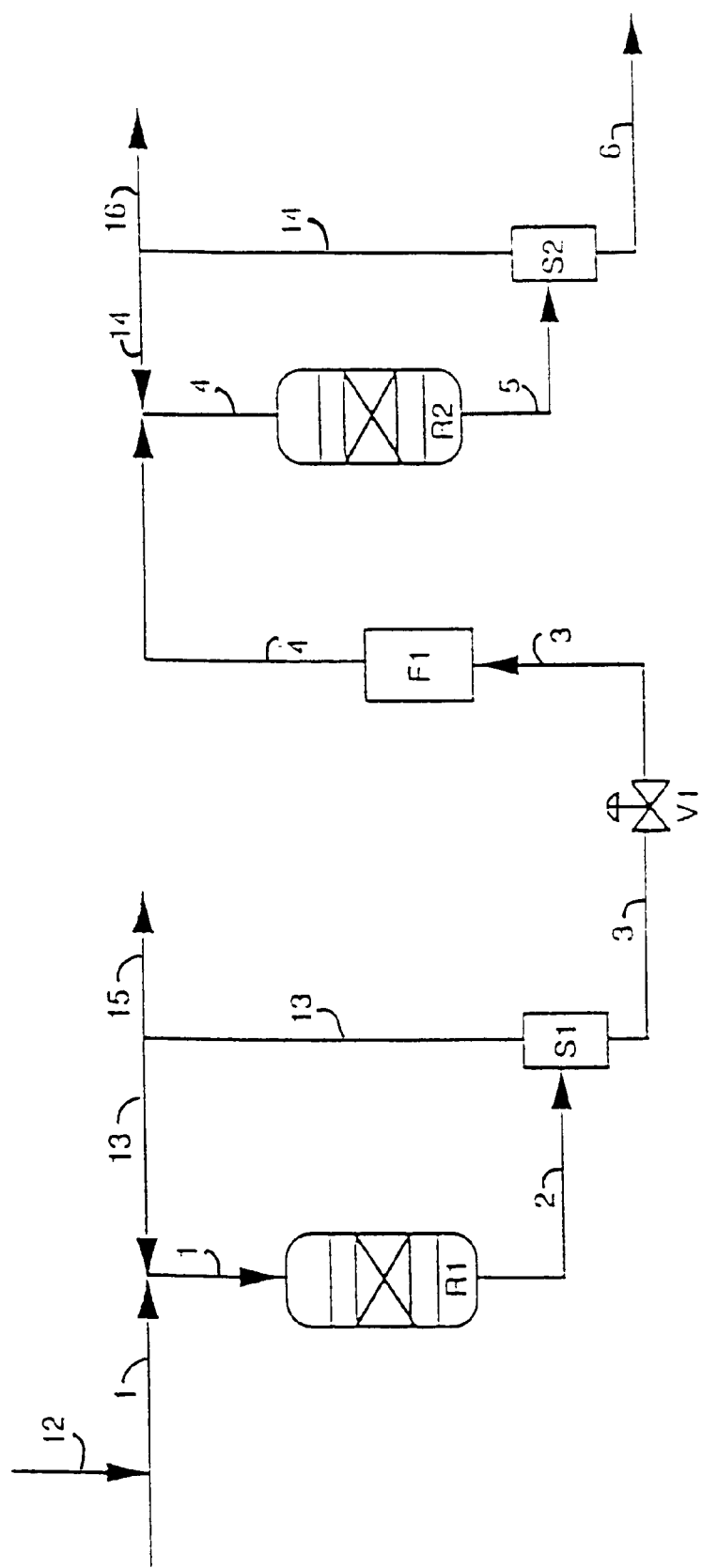

PROCESS FOR ISOMERIZING AND DEHYDROGENATING USING A CATALYST ACTIVATED BY SULFURIZATION AND PASSIVATION WITH AMMONIA OR PRECURSOR THEREOF

FIELD OF THE INVENTION

This invention relates to the area of the isomerization processes of aromatic compounds with eight carbon atoms.

BACKGROUND OF THE INVENTION

According to the known processes for isomerization of aromatic compounds with eight carbon atoms, a feedstock that is generally low in paraxylene relative to the thermodynamic equilibrium of the mixture (i.e., whose paraxylene content is clearly less than that of the mixture with the thermodynamic equilibrium at the temperature in question, whereby this mixture comprises at least one compound that is selected from the group that is formed by metaxylene, orthoxylene, paraxylene and ethylbenzene) and generally rich in ethylbenzene relative to this same mixture in thermodynamic equilibrium is introduced into a reactor that contains at least one catalyst under suitable temperature and pressure conditions to obtain a composition, at the outlet of said reactor, of aromatic compounds with eight carbon atoms that is as close as possible to the composition of said mixture in thermodynamic equilibrium at the temperature of the reactor.

Paraxylene and optionally orthoxylene, which are the desired isomers because they exhibit an important advantage particularly for the synthetic fiber industry, are then separated from this mixture. Metaxylene and ethylbenzene can then be recycled to the inlet of the isomerization reactor so as to increase the production of paraxylene and orthoxylene. When it is not desired to recover orthoxylene, the latter is recycled with metaxylene and ethylbenzene.

The isomerization reactions of the aromatic compounds with eight carbon atoms per molecule pose, however, several problems that are produced by secondary reactions. Thus, in addition to the main isomerization reaction, hydrogenation reactions are observed, such as, for example, the hydrogenation of the aromatic compounds of naphthenes, reactions of opening naphthene cycles that lead to the formation of paraffins that have at most the same number of carbon atoms per molecule as the naphthenes from which they are obtained. Cracking reactions are also observed, such as, for example, the cracking of paraffins that lead to the formation of light paraffins that typically have from three to five carbon atoms per molecule, dismutation and transalkylation reactions that lead to the production of benzene, toluene, aromatic compounds with nine carbon atoms per molecule (trimethylbenzenes, for example) and heavier aromatic compounds.

All of these secondary reactions are greatly detrimental to the yields of desired products.

The amount of secondary products that are formed (naphthenes that typically contain from five to eight carbon atoms, paraffins that typically contain from three to eight carbon atoms, benzene, toluene, aromatic compounds with, for the most part, nine and ten carbon atoms per molecule) depends on the nature of the catalyst and the operating conditions of the isomerization reactor (temperature, partial hydrogen and hydrocarbon pressures, feedstock flow rate).

It is well known to one skilled in the art that in certain catalytic processes, procedures for activating and/or selecting the catalyst are necessary to optimize the performances of the catalyst. For example, in the case of catalyst that contains a metal of group VIII of the periodic table (Handbook of Physics and Chemistry, 45th Edition 1964–65), such as, for example, platinum, it is well known to pretreat the catalyst with hydrogen sulfide ($H_2S$). The sulfur that is contained in the hydrogen sulfide molecule is attached to the metal and imparts to it improved catalytic properties.

In addition, it has been shown that the secondary reactions increase when the paraxylene content in the reactor is closer to the paraxylene content in thermodynamic equilibrium under given pressure and temperature conditions.

The optimization of the operating conditions and the formulation of the isomerization catalyst make it possible to improve the paraxylene yield but not to be loss-free.

SUMMARY OF THE INVENTION

The invention relates to a process for isomerization of a feedstock that contains aromatic compounds with eight carbon atoms that comprises at least one isomerization stage a) that is carried out in the presence of activated catalyst according to the particular procedure that is described below and at least one dehydrogenation stage b). The process for activation of the isomerization catalysts comprises at least one sulfurization stage and at least one stage for passivation with ammonia.

It has actually been discovered that, on the one hand, catalytic performance levels are improved when a catalyst is used in a presulfurized form or a sulfurized form after introduction into the reactor and that it is subjected to a passivation in the presence of ammonia ($NH_3$) or a precursor of ammonia and that, on the other hand, it is possible to reach paraxylene contents that are close to the paraxylene content in thermodynamic equilibrium under given pressure and temperature conditions while reducing the xylene losses by combining at least two reaction stages.

DETAILED DESCRIPTION OF THE INVENTION

According to a particular embodiment of this invention, the feedstock that is treated in the isomerization stage contains at least ethylbenzene or at least metaxylene or at least a mixture of ethylbenzene and metaxylene.

Isomerization stage a) of the process according to the invention uses an activated catalyst which, starting from a mixture that contains aromatic compounds with eight carbon atoms including xylenes and/or ethylbenzene, makes it possible to obtain a composition—xylenes and ethylbenzene—that is close to that of the composition of the mixture in thermodynamic equilibrium under given temperature and pressure conditions.

The activation process of said catalyst pertains to all of the catalysts for isomerization of aromatic compounds with eight carbon atoms that contain at least one metal or metal compound of group VIII that is selected from among iron, cobalt, nickel, ruthenium, rhodium, palladium, osmium, iridium and platinum, and preferably at least one noble metal or noble metal compound of group VIII, preferably selected from among platinum and palladium. This catalyst also comprises at least one matrix and optionally at least one additional element that is a metal or a metal compound that is selected from the complex that is formed by the metals or metal compounds of groups III.A and IV.A.

The catalyst that is used in stage a) of the process according to the invention is a supported catalyst and can contain at least one zeolite that is preferably selected from among the zeolites of mordenite structural type (MOR), MFI, EUO or mazzite, such as, for example, the omega zeolite.

In a preferred form of the invention, the zeolite is of MOR or EUO structural type, such as, for example, the EU-1 zeolite.

The EUO- or MOR-type zeolite contains silicon and at least one element T that is selected from the group that is formed by aluminum, iron, gallium and boron, preferably aluminum or boron. In the case of the zeolite of EUO structural type, the overall atomic Si/T ratio is greater than 5, preferably about 5 to 100. For the zeolite of MOR structural type, the Si/T ratio is usually less than 20, and most often between 5 and 15.

The zeolite of EUO or MOR structural type according to a preferred embodiment of the invention is at least in part, preferably virtually totally, in acid form, i.e., in hydrogen form ($H_+$), whereby the sodium content is such that the Na/T atomic ratio is less than 0.5, preferably less than 0.1.

When the catalyst contains a zeolite, said zeolite represents 1 to 90% by weight, preferably 3 to 60% by weight, and even more preferably 4 to 40% by weight relative to the total weight of the catalyst. The content by weight of said element(s) of group VIII is generally from about 0.01 to 2.0% relative to the total weight of the catalyst, preferably from about 0.05 to 1.0% relative to the total weight of the catalyst. This element of group VIII is preferably selected from the group that is formed by platinum and palladium. Most often, this element is platinum.

The catalyst of stage a) of the process of this invention optionally contains at least one additional element that is selected from the complex that is formed by elements of groups III.A and IN A VACUUM.A of the periodic table, preferably selected from the group that is formed by tin and indium. The content by weight of said element(s) is generally from about 0.01 to 2.0% relative to the total weight of the catalyst, preferably from about 0.05 to 1.0% relative to the total weight of the catalyst.

A matrix (or binder) usually ensures the addition to 100% by weight in the catalyst. It is generally selected from the group that is formed by the natural clays (for example kaolin or bentonite), synthetic clays, magnesia, aluminas, silicas, silica-aluminas, titanium oxide, boron oxide, zirconia, aluminum phosphates, titanium phosphates, zirconium phosphates, preferably from among the elements of the group that is formed by the aluminas and the clays. This matrix can be a single compound or a mixture of at least two of these compounds.

The process for activation of the catalysts that are used in stage a) that can isomerize aromatic compounds that contain eight carbon atoms comprises at least one sulfurization stage and at least one stage for passivation with ammonia that are carried out in any order, whereby the sulfurization stage is generally preceded by a stage of reduction of the metal compound that is contained in the catalyst.

The sulfurization of the catalyst is carried out with a sulfur compound, for example hydrogen sulfide or a hydrogen sulfide precursor. The sulfurization of the catalyst can be carried out before introducing said catalyst into the reactor; the catalyst is then called a "presulfurized catalyst." It can also be carried out on a catalyst that is already in place in the reactor.

In general, before sulfurization, the metal compound of group VIII that is contained in the catalyst is reduced. This presulfurization stage can be carried out by pure hydrogen sulfide or by a preferably organic precursor of hydrogen sulfide, which will then be decomposed in the reactor.

Without this list having a limiting nature, the sulfurized organic compounds that can be used in the sulfurization stage are, for example, the sulfurized alkyl compounds, the sulfurized aryl compounds, and the sulfurized alkylaryl compounds. As examples, butylethyl sulfide, diallyl sulfide, dibutyl sulfide, dipropyl sulfide, dimethyl disulfide (DMDS), thiophene, dimethyl thiophene and ethylthiophene will be cited.

The sulfurization stage of the catalyst is usually carried out in a neutral or reducing atmosphere at a temperature of about 20 to 500° C. and preferably about 60 to 400° C., at an absolute pressure of about 0.1 to 5 MPa and preferably about 0.3 to 3 MPa and with a gas volume (inert or reducing) per volume of catalyst per hour (V.V.H.) of about 50 $h^{-1}$ to 600 $h^{-1}$ and preferably about 100 to 200 $h^{-1}$. Most often, the inert gas that is used is nitrogen, and the reducing gas is usually most often essentially pure hydrogen.

The sulfurization stage is associated with a passivation stage in the presence of ammonia ($NH_3$). The passivation can be carried out before or after the sulfurization stage. In a preferred way, the sulfurization stage is carried out before the passivation stage. These two stages of sulfurization and passivation can be carried out before or after the introduction of the catalyst in the reactor. In a preferred way, the passivation stage in the presence of ammonia is carried out whereas the catalyst is already in place in the reactor.

The passivation with ammonia is carried out most often in two periods: at least one injection of at least a specified amount of ammonia, in $NH_3$ vapor form, or in the form of a precursor compound of ammonia, then at least one continuous injection of ammonia in $NH_3$ vapor form or in the form of at least one precursor compound of ammonia during the introduction of the feedstock that is to be isomerized. The duration of the injection of the second ammonia period in $NH_3$ vapor form of this ammonia precursor depends on the duration of operation of the catalyst; in particular it depends on the stabilization of temperatures within the catalyst. The first injection is preferably carried out with $NH_3$ in vapor form, and the second injection is carried out with at least one precursor compound of ammonia.

The precursors of ammonia ($NH_3$) that can be used within the scope of this invention are all the compounds that are known to one skilled in the art that, in the presence of hydrogen, decompose into ammonia that attaches to the catalyst. Among the compounds that can be used, it is possible to cite the aliphatic amines, such as, for example, n-butylamine.

According to a preferred embodiment of this invention, the stages of sulfurization and passivation with ammonia are carried out after the catalyst is charged in the reactor, and the sulfurization stage is preceded by a catalyst reduction stage.

The reduction of the catalyst is carried out in the presence of hydrogen that preferably has a purity that is greater than 90 mol %. The reduction temperature is about 300 to 550° C. and preferably about 400 to 520° C. The total pressure is between atmospheric pressure and 3 MPa, and preferably it is from about 0.5 to 2 MPa. The duration of the reduction stage is usually from about 1 to 40 hours and preferably from about 1 to 8 hours.

The hydrogen flow rate (addition of fresh hydrogen and recycled hydrogen from the outlet to the inlet of the reactor) is from about 0.1 l/h/g to 100 l/h/g of catalyst.

When the sulfurization stage in the presence of hydrogen of the catalyst is carried out most often by using hydrogen sulfide ($H_2S$) as a sulfurizing agent, an amount of hydrogen sulfide that corresponds to a content by weight of about 0.01 to 0.8% and preferably from about 0.01 to 0.5% relative to the mass of the catalyst is introduced into the reactor. The temperature, pressure and hydrogen flow rate conditions are identical to those of the reduction stage, in contrast, the hydrogen that is introduced into the reactor is preferably only recycled hydrogen.

The passivation with ammonia during the first period of this passivation is carried out by using gaseous ammonia or a precursor compound of ammonia, in general mixed with hydrogen.

The amount of ammonia that is introduced into the reactor is from about 0.02 to 5% by mass and preferably from about 0.1 to 2% by mass relative to the mass of the catalyst.

The temperature, pressure and hydrogen flow rate conditions are identical to those of the reduction stage; in contrast, the hydrogen that is introduced into the reactor is preferably only recycled hydrogen.

The isomerization process of a feedstock that contains aromatic compounds with eight carbon atoms comprises at least one isomerization stage a) that is carried out in the presence of an activated catalyst according to the preceding activation process and that contains at least one metal of group VIII and preferably at least one zeolite of EUO or MOR structural type, at least one matrix and optionally at least one additional element and at least one dehydrogenation stage b).

In the first stage of the isomerization process according to this invention, the operating conditions of the isomerization zone are selected to reduce the production of undesirable compounds that are obtained from reactions that cause acid catalysis mechanisms (cracking, dealkylation, dismutation, . . . ) to take effect. These operating conditions are such that the production of naphthenes with eight carbon atoms per molecule is significantly larger—about 10 to 30% by mass of the outlet effluent of the isomerization zone—than the production that is obtained by standard isomerization processes of aromatic compounds that contain eight carbon atoms—which is generally from about 5 to 10% by mass of the outlet effluent of the isomerization zone.

The effluent that is obtained at the end of the first reaction stage is treated during a second stage in a reaction zone that contains at least one dehydrogenation catalyst. The operating conditions of this second stage can be different from or identical to the operating conditions of the first stage, preferably the operating conditions of these two stages are different. The operating conditions of this second stage are determined so as to obtain a composition of the mixture of xylenes and ethylbenzene that is the closest possible to the composition in thermodynamic equilibrium.

The catalysts for dehydrogenation of paraffins and naphthenes are well known to one skilled in the art. The substrates of these catalysts are generally refractory oxides; most often an alumina is selected. These dehydrogenation catalysts comprise at least one noble metal of group VIII of the periodic table and at least one alkaline element or alkaline earth element of groups I.A and II.A of the periodic table. Preferably, the noble metal of group VIII that is selected is platinum, and the element of groups I.A or II.A of the periodic table is selected from the group that comprises magnesium, potassium, and calcium.

These dehydrogenation catalysts can also contain thorium and/or at least one element M of groups IV.A or IV.B of the periodic table. The elements of groups IV.A or IV.B are most often selected from the group that is formed by tin, silicon, titanium and zirconium. Some dehydrogenation catalysts also contain sulfur and/or a halogen. More particularly, it is possible to use the dehydrogenation catalysts that are described in U.S. Pat. Nos. 3,998,900 and 3,531,543 in the dehydrogenation stage of the process according to this invention.

Without wanting to be tied to any particular theory, it is noted that platinum exhibits a hydrogenolyzing activity that is expressed to the detriment of the activity of the dehydrogenation of naphthenes into aromatic compounds. This hydrogenolyzing activity can be greatly reduced, and the selectivity of the catalyst relative to the dehydrogenation reaction can be increased by adding additional element M.

The refractory inorganic substrates that are used often have an acidic nature and can generate undesirable secondary reactions, such as cracking or isomerization reactions. This is why the oxide substrate is generally neutralized by the addition of at least one metal or an alkaline metal compound or an alkaline-earth metal compound.

According to a preferred embodiment of this invention, at least one compound that has a boiling point of about 80 to about 135° C., preferably at least one compound that is selected from the group that is formed by the paraffins with eight carbon atoms per molecule, benzene, toluene, and naphthenes with eight carbon atoms, is added to the feedstock that is introduced in the isomerization zone.

This compound or these compounds are added to the feedstock that is to be treated in the form of recycling and/or in the form of fresh compounds in amounts such that the percentages per unit of mass of added compounds relative to the total feedstock that enters the reactor are usually as follows:

the percentage of paraffins with eight carbon atoms, in the optional case where this compound is added, is from about 0.1 to 10% by mass, preferably from about 0.2 to 2% by mass, the percentage of naphthenes with eight carbon atoms, in the optional case where this compound is added, is from about 0.5 to 15% by mass, and preferably from about 2 to 8% by mass, the percentage of toluene, in the optional case where this compound is added, is from about 0.1 to 10% by mass, preferably from about 0.2 to 5% by mass, the percentage of benzene, in the optional case where this compound is added, is from about 0.1 to 10% by mass, preferably from about 0.2 to 2% by mass.

The percentage of total compounds that are added when several compounds are added represents about 0.1 to 20% by mass and often about 2 to 15% by mass relative to the total feedstock that enters the isomerization zone.

According to a preferred embodiment of the invention, at least two different compounds that each have a boiling point of about 80° C. to 135° C. are introduced into the reaction zone. More particularly, at least one naphthene with eight carbon atoms and at least one paraffin with eight carbon atoms are introduced. In another variant, when these compounds are obtained from recycling of a liquid fraction that leaves the dehydrogenation reactor, all of the compounds that are contained in this liquid fraction that have boiling points of about 80° C. to 135° C. are introduced without being separated.

In the process of this invention, the isomerization stage is used in the presence of hydrogen that can be introduced in the form of fresh hydrogen, in the form of recycled hydrogen that is obtained from the outlet of the isomerization zone or in the form of recycled hydrogen that is obtained from the outlet of the dehydrogenation zone. The operating conditions of the isomerization stage are as follows: a reaction temperature of about 300 to 500° C., preferably of about 320 to 400° C., a partial hydrogen pressure of about 0.3 to 1.5 MPa, preferably of about 0.4 to 1.2 MPa, a total pressure of about 0.4 to 2 MPa, preferably of about 0.6 to 1.5 MPa, and a P.P.H. (feedstock weight/catalyst weight/hour) of about 0.2 to 10 $h^{-1}$, preferably of about 3 to 6 $h^{-1}$.

In the process according to this invention, the dehydrogenation stage is used in the presence of hydrogen that can be introduced in the form of fresh hydrogen, in the form of recycled hydrogen that is obtained from the outlet of the isomerization zone or in the form of recycled hydrogen that is obtained from the outlet of the dehydrogenation zone.

The operating conditions for the dehydrogenation stage are a temperature of about 300 to 500° C., preferably of about 400 to 420° C., a partial absolute hydrogen pressure of about 0.1 to 1.5 MPa, preferably of about 0.4 to 1 MPa, a total absolute pressure of about 0.2 to 2 MPa, preferably of about 0.5 to 1.5 MPa and a PPH (feedstock weight/catalyst weight/hour) of about 0.2 to 10 $h^{-1}$, preferably of about 3 to 6 $h^{-1}$.

In addition, it is also possible to carry out a recycling of aromatic compounds with eight carbon atoms that are contained in the effluent of the dehydrogenation zone after the desired compounds, i.e., paraxylene and optionally orthoxylene, have been extracted.

DESCRIPTION OF THE DRAWING

The FIGURE depicts a simple embodiment of the process according to the invention.

According to this figure, the feedstock that is to be treated is introduced into isomerization zone R1 that comprises an activated catalyst that contains an EUO- or MOR-structural-type zeolite, at least one noble metal of group VIII, a matrix and optionally at least one additional element via line 1.

Essentially pure hydrogen is introduced into line 1 via line 12, and the recycled hydrogen is introduced into line 1 via line 13. A purging of the hydrogen that circulates in line 13 is carried out via line 15. The effluent of isomerization zone R1 is sent into a separation zone S1 via line 2.

In S1, the hydrogen that is contained in the effluent is isolated and recycled to the inlet of isomerization zone R1 via line 13, and the remainder of the effluent is evacuated from this separation zone S1 via line 3. This line 3 is equipped with a pressure regulating valve V1. The fluid that is contained in line 3 is heated in a furnace F1 and then is evacuated from this furnace via line 4. The effluent that leaves from the furnace via line 4 is enriched with hydrogen that is recycled via line 14, and then this mixture is introduced into dehydrogenation zone R2. The effluent of zone R2 is sent via line 5 into separation zone S2.

In S2, the hydrogen that is contained in the effluent is isolated and recycled to the inlet of dehydrogenation zone R2 via line 14, and the remainder of the effluent is evacuated from separation zone S2 via a line 6. A purging of the hydrogen that circulates in line 14 is carried out via line 16.

The entire disclosure of all applications, patents and publications, cited above and below, and of corresponding French application 98/11.319, filed Sep. 10, 1998, are hereby incorporated by reference.

The following examples illustrate the invention without limiting its scope.

EXAMPLE 1

According to the Invention

A pilot unit is used that comprises two reactors in series R1 and R2, whereby each is equipped with hydrogen recycling and a pressure regulating valve is placed between the two reactors. Each of the reactors is heated electrically and operates according to an isothermal mode.

Each reactor contains 60 g of catalyst that is specific to each stage.

The catalyst of the isomerization stage that is used in this example is prepared according to the following procedure.

The base material that is used is an EUO-structural-type zeolite, the EU-1 zeolite, raw straight from synthesis, that comprises the organic structure, silicon and aluminum, and that has an overall atomic Si/Al ratio that is equal to 13.6, a content by weight of sodium relative to the dry EU-1 zeolite weight of 1.5%, corresponding to an Na/Al atomic ratio of 0.6.

This EU-1 zeolite first undergoes a so-called dry calcination at 550° C. under a stream of air for 6 hours. Then, the solid that is obtained is subjected to three ionic exchanges in a 10N solution of $NH_4NO_3$ at about 100° C. for 4 hours for each exchange.

At the end of these treatments, the EU-1 zeolite in $NH_4$ form has an overall atomic Si/Al ratio that is equal to 18.3, a content by weight of sodium relative to the dry EU-1 zeolite weight of 50 ppm.

The EU-1 zeolite is then shaped by extrusion with an alumina gel to obtain, after drying and calcination in dry air, substrate S1 that consists of extrudates that are 1.4 mm in diameter and that contains 10% by weight of EU-1 zeolite in $H^+$ form and 90% of alumina.

Substrate S1 that is thus obtained is subjected to an anionic exchange with hexachloroplatinic acid in the presence of a competing agent (hydrochloric acid) so as to introduce platinum in the catalyst. The moist solid is then dried at 120° C. for 12 hours and calcined under a flow of dry air at the temperature of 500° C. for one hour.

The catalyst that is thus obtained contains 10.0% by weight of EU-1 zeolite in $H^+$ form, 89.7% of alumina and 0.29% of platinum.

The dehydrogenation catalyst that is used for the second stage of the process according to the invention is a catalyst with an alumina base that contains 0.6% by mass of platinum, 0.9% by mass of tin, 0.9% by mass of potassium and 0.6% by mass of chlorine.

After charging, the isomerization catalyst is dried, then the metal that is contained in the catalyst is reduced to 450° C., then a sulfurization stage is initiated with hydrogen sulfide ($H_2S$) under a pressure of 16 bar absolute.

To carry out this sulfurization, an amount of $H_2S$ that is equal to 0.1% by mass relative to the mass of the catalyst is introduced, and the temperature is then 380° C.

After $H_2S$ is injected, the reactor is kept at 380° C. for one hour with hydrogen recycling—without the addition of fresh hydrogen. Then, the temperature of the reactor is brought to 390° C., and the temperature is increased gradually for one hour. It then remains at 390° C. for 2 hours.

Before ammonia is introduced, the temperature of the reactor is gradually brought to 425° C., and then this temperature is maintained for one hour.

The amount of $NH_3$ that is injected is equal to 0.25% by mass relative to the mass of the catalyst. After the ammonia is injected, the catalyst is left at 425° C. for 2 hours with hydrogen recycling. Then, the temperature of the reactor is gradually reduced to 390° C., and this reduction lasts for 2 hours.

With the temperature being stabilized at 390° C., a hydrogen flow rate of 10 nl/h (normal liters per hour) is established. Then, the feedstock that is treated with 0.034% by mass of n-butylamine is injected.

The feedstock that is to be converted is a mixture of aromatic compounds with eight carbon atoms, and its composition is given in Table 1 below.

The conditions of the injection of the feedstock that is to be isomerized are as follows: a temperature of 390° C., a P.P.H. of 3 h$^{-1}$ and a total pressure of 1.5 MPa.

In the dehydrogenation reactor (R2), the temperature is 400° C. and the total pressure is 0.9 MPa.

In the tables below, the following abbreviations are used: "C1–C8 paraffins" for paraffins that contain from 1 to 8 carbon atoms, "C5 to C9 naphthenes" for naphthenes that contain 5 to 9 carbon atoms, and "C9+ aromatic compounds" for aromatic compounds that contain nine or more carbon atoms.

TABLE 1

| Compounds | Inlet | Outlet R1 | Outlet R2 |
| --- | --- | --- | --- |
| C1–C8 paraffins | 0 | 0.61 | 0.75 |
| C5 to C9 naphthenes | 0 | 19.42 | 1.68 |
| benzene | 0 | 0.03 | 0.06 |
| toluene | 0 | 0.18 | 0.24 |
| ethylbenzene | 14.01 | 7.28 | 8.65 |
| paraxylene | 1.52 | 16.50 | 20.85 |
| metaxylene | 56.52 | 37.89 | 46.91 |
| orthoxylene | 27.95 | 17.58 | 20.19 |
| C9+ aromatic compounds | 0 | 0.51 | 0.67 |

EXAMPLE 2

For Comparison, not in Accordance with the Invention

Each reactor contains 60 g of catalyst that is specific to each stage that is described in Example 1.

The stages of reduction and sulfurization of the isomerization catalyst of Example 1 are repeated identically. The passivation stage by ammonia is not carried out, and n-butylamine is not added into the feedstock.

The same feedstock is used under the same operating conditions as those that are described in Example 1.

The compositions per unit of mass of the feedstock and effluent output of each of the reactors is indicated in Table 2 below.

TABLE 2

| Compounds | Inlet | Outlet R1 | Outlet R2 |
| --- | --- | --- | --- |
| C1–C8 paraffins | 0 | 0.77 | 0.91 |
| C5 to C9 naphthenes | 0 | 20.59 | 2.20 |
| benzene | 0 | 0.04 | 0.07 |
| toluene | 0 | 0.26 | 0.32 |
| ethylbenzene | 14.01 | 7.20 | 8.58 |
| paraxylene | 1.52 | 15.99 | 20.36 |
| metaxylene | 56.52 | 37.23 | 46.69 |
| orthoxylene | 27.95 | 17.28 | 20.05 |
| C9+ aromatic compounds | 0 | 0.64 | 0.82 |

The results that are noted in Tables 1 and 2 very clearly show the advantage that there is in using the process according to this invention. The paraxylene production is high; it is 20.85% by mass when the process according to the invention is used instead of 20.36% by mass when a process in 2 successive stages is used without passivation by the ammonia of the isomerization catalyst.

The yield of aromatic compounds with eight carbon atoms increases from 95.68 to 96.60% by weight when the procedure of this invention is applied.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A process for isomerization of a feedstock containing aromatic compounds having eight carbon atoms, said process comprising (a) conduct least one isomerization stage carried out at a temperature of 320° C. to 400° C., and in the presence of a catalyst containing at least one metal of group VIII, said catalyst having been activated according to an activation process comprising at least one sulfurization stage and at least one passivation stage with ammonia or with an ammonia precursor, to obtain an effluent containing 10 to 30%, by mass of the outlet effluent, naphthenes with eight carbon atoms, and (b) conducting with the outlet effluent of the at least one isomerization stage at least one dehydrogenation stage.

2. A process of isomerization according to claim 1, wherein the feedstock in the isomerization stage contains at least one of ethylbenzene and metaxylene.

3. A process of isomerization according to claim 1, wherein the catalyst of stage a) further comprises at least one matrix, and at least one additional element selected the group consisting of the metals of groups III.A and IV.A of the periodic table.

4. A process of isomerization according to claim 1, wherein the catalyst of stage a) further comprises at least one zeolite.

5. A process of isomerization according to claim 4, wherein the zeolite is selected from the group consisting of the mordenites, the omega zeolite, the MFI-structural zeolites and the EUO-structure zeolites.

6. A process of isomerization according to claim 4, wherein the zeolite contained in the catalyst of stage a) is a EU-1 zeolite of EUO structure, whereby said zeolite contains silicon and at least one element T that is selected from the group consisting of aluminum, iron, gallium and boron, such that the overall atomic Si/T ratio is greater than 5, said zeolite being at least partly in acid form.

7. A process of isomerization according to claim 4, wherein the zeolite contained in the activated catalyst is a MOR zeolite, said zeolite containing silicon and at least one element T that is selected from the group consisting of aluminum, iron, gallium and boron, such that the overall atomic Si/T ratio is less than 20, and said zeolite being at least partly in acid form.

8. A process of isomerization according to claim 1, wherein the process of activation of the catalyst of stage a) comprises at least one stage of reduction of the metal compound contained in the catalyst, at least one stage of sulfurization and at least one stage of passivation with ammonia.

9. A process of isomerization according to claim 1, wherein the sulfurization stage of the activation process is carried out before the introduction of the catalyst in a reactor or on a catalyst that is already placed in the reactor, under a neutral or reducing atmosphere at a temperature of about 20 to 500° C., at an absolute pressure of about 0.1 to 5 MPa and with a gas volume (inert or reducing) per volume of catalyst per hour of about 50 to 600 $h^{-1}$.

10. A process of isomerization according to claim 1, wherein the sulfurization stage of the activation process is carried out with hydrogen sulfide or a precursor thereof that can be decomposed to obtain hydrogen sulfide.

11. A process of isomerization according to claim 1, wherein the passivation stage of the activation process comprises a first step during which at least one injection is carried out of an amount of about 0.02 to 5% by mass relative to the mass of the catalyst, ammonia in vapor form or in the form of at least one precursor compound of ammonia, at a temperature of about 20 to 300° C., an absolute pressure of about 0.1 to 5 MPa, and in the presence of an inert or reducing gas volume per volume of catalyst per hour of about 50 to 600 $h^{-1}$, and a second step during which at least one continuous injection of ammonia is carried out in vapor form or in the form of at least one precursor compound of ammonia during the introduction of the feedstock that is to be isomerized in an amount that corresponds to about 20 to 500 ppm by mass relative to the mass of the catalyst.

12. A process of isomerization according to claim 1, wherein the passivation stage of the activation process is carried out in the presence of hydrogen.

13. A process of isomerization according to claim 8, wherein the reduction stage of the metal compound of the catalyst, in the activation process, is carried out in the presence of hydrogen that has a purity that is greater than or equal to 90 mol %, at a temperature of about 300 to 550° C., at a total pressure of between atmospheric pressure and 3 MPa, whereby the duration of the reduction is about 1 to 40 hours.

14. A process of isomerization according to claim 1, wherein the catalyst that is used to carry out the dehydrogenation reaction of stage b) comprises a substrate that contains at least one refractory oxide, at least one noble metal of group VIII and at least one element of groups I.A or II.A.

15. A process of isomerization according to claim 1, wherein a catalyst used for carrying out the dehydrogenation reaction of stage b) comprises at least one element selected from the group consisting of thorium and the elements of groups IVa and IVb.

16. A process of isomerization according to claim 1, wherein the dehydrogenation reaction of stage b) is carried out at a temperature of about 300° C. to 500° C., at a partial absolute hydrogen pressure of about 0.1 to 1.5 MPa, at a total absolute partial pressure of about 0.2 to 2 MPa and at a P.P.H. (feedstock weight/catalyst weight/hour) of about 0.20 to 10 $h^{-1}$.

17. A process of isomerization according to claim 1, wherein at least one compound having a boiling point of about 80 to about 135° C. is added to the fresh feedstock in the form of recycled or fresh compounds, or in the form of a mixture of recycled and fresh compounds.

18. A process of isomerization according to claim 17, wherein the compounds represent about 0.1 to 20% by mass of the total feedstock that enters the isomerization zone.

19. A process according to claim 1, wherein the sulfurization stage comprises introducing an amount of $H_2S$ equal to 0.1% by mass relative to the mass of the catalyst.

* * * * *